Patented Aug. 24, 1937

2,090,652

UNITED STATES PATENT OFFICE 2,090,652

PROCESS FOR THE PURIFICATION OF N-MONOMETHYL-P-AMINOPHENOL AND ITS SULPHATE

Harold Von Bramer, Albert C. Ruggles, and Edwin A. Robinson, Kingsport, Tenn., assignors, by mesne assignments, to Eastman Kodak Company, Jersey City, N. J., a corporation of New Jersey No Drawing. Application March 12, 1935, Serial No. 10,656

21 Claims. (Cl. 260—128)

This invention relates to a process for the purification of N-monomethyl-p-aminophenol and its sulphate.

A copending application, Serial No. 697,527, filed September 10, 1933 in the name of Harold Von Bramer and Albert C. Ruggles describes a process for preparing N-monomethyl-p-aminophenol and its sulphate by the interaction of monomethylamine with hydroquinone in a dilute aqueous solution and at an elevated temperature, followed by sulphating the N-monomethyl-p-aminophenol so formed, in case it is the sulphate which is desired. The products obtained in this process, while of sufficient purity for some purposes, are unsatisfactory in others because they contain traces of N,N'-dimethyl-p-phenylenediamine or its sulphate. In certain commercial processes, N-monomethyl-p-aminophenol sulphate which contains even a few parts per million of N,N'-dimethyl-p-phenylenediamine sulphate, as for instance two or three parts per million, is unsatisfactory. Accordingly, the process of purification set forth in the present application was devised to produce N-monomethyl-p-aminophenol and its sulphate which are practically entirely free from N,N'-dimethyl-p-phenylenediamine and its sulphate as well as other amines, imines and tarry impurities.

The object of the present inventon, therefore, is to provide a process for the purification of N-monomethyl-p-aminophenol and its sulphate. Other objects will appear hereinafter.

According to the copending application referred to above, N-monomethyl-p-aminophenol may be prepared by the interaction of monomethylamine and hydroquinone in dilute aqueous solution, the reaction being carried out at an elevated temperature and in an autoclave. A typical batch of N-monomethyl-p-aminophenol, as it comes from the autoclave and after removal of the excess monomethylamine, is in the form of a slurry and contains as impurities and excess reactants the following:

(1) N,N'-dimethyl-p-phenylenediamine
(2) Non-volatile amines and tar
(3) Hydroquinone The present process of purification eliminates these impurities and allows of the recovery of the excess hydroquinone by means of the following steps:

(a) *Steam distillation.*—This step removes the N,N'-dimethyl-p-phenylenediamine. The steam distillation is preferably carried out at a diminished pressure, such as a pressure of 25–30 mm. However, distillation at an elevated pressure has been found satisfactory. The N-monomethyl-p-aminophenol is prevented from distilling by converting it into a metal salt, preferably an alkali metal salt, such as its sodium salt. An agent which serves to prevent oxidation of the metal salt of the N-monomethyl-p-aminophenol, for instance, a reducing agent, such as a mixture of sodium sulphite and zinc dust, is added, since it is well known that phenols are susceptible to oxidation by atmospheric oxygen, particularly when in the presence of alkalies. The reducing agent is, of course, unnecessary if oxidants, such as air, are excluded during the steam distillation. The steam distillation is continued until the N,N'-dimethyl-p-phenylenediamine is completely removed. This end-point can be determined by any suitable means, such as by means of a very sensitive chemical test.

(b) *Agitation with a sorbent.*—This step removes the non-volatile amines and tarry impurities. Oxidants, such as atmospheric oxygen, are preferably excluded throughout the various manipulations of this step, particularly, since the N-monomethyl-p-aminophenol is preferably in the form of its alkali metal salt and consequently in an alkaline medium. This exclusion of oxidants is conveniently accomplished by providing an inert atmosphere, such as an atmosphere of nitrogen. However any method of excluding oxidants will suffice. The residue from step (a) is transferred to a vessel provided with an agitator, if necessary water is added to effect a solution, and a sorbent, such as activated charcoal, is added. If the sorbent is activated charcoal, an amount equal to about 10% of the weight of the crude product used is sufficient, although this amount may vary according to the type or grade of sorbent employed. Agitation is continued for a short period of time, preferably about thirty minutes. However, the period of time of agitation will again depend upon the characteristics of the sorbent. Such choices of amount of sorbent, periods of time, etc., will be apparent to those skilled in the art upon their perusal of these specifications. Should not the treatment with the sorbent, described above, appear to remove all the non-volatile amines and tar, it can be repeated as often as necessary.

This sorbent, with the non-volatile amines and tarry impurities sorbed by its surfaces, is filtered off. To the resulting solution is added an agent, which acts to free the N-monomethyl-p-aminophenol from its metal salt, preferably an alkali metal bisulphite, such as a sodium bisulphite, or an aqueous or alcoholic solution of sulphur dioxide.

(c) *Azeotropic distillation.*—This step removes the water, allowing the precipitation of N-monomethyl-p-aminophenol as its sulphate and further allows of the recovery of the excess hydroquinone. To the solution from step (b) is added an organic solvent so chosen that the solvent forms with water an azeotropic mixture which has a boiling point below that of any other azeotropic mixture or single component of the system, that is, the organic solvent forms with water an azeotropic mixture, having a minimum boiling point. This organic solvent must also be capable of dissolving N-monomethyl-p-aminophenol and hydroquinone. A suitable organic solvent, having the properties indicated above, is a mixture of n-butanol and n-butyl acetate, preferably employed as a mixture 43.7% (by weight) of which is n-butanol and 53.6% is n-butyl acetate. The ternary system thus prepared is subjected to distillation. The condensate separates into a water and a solvent layer. The solvent is returned to the still while the water passes to a suitable receiver. When all of the water has been distilled off, the liquid material is removed from the still, leaving a residue of inorganic salts. The removed liquid is cooled and treated with sulphuric acid, preferably a 50% (weight) aqueous solution. The N-monomethyl-p-aminophenol precipitates as the sulphate which is entirely free from traces of the sulphate of N,N'-dimethyl-p-phenylenediamine. There remains to filter off and wash the sulphate with a small amount of water and subject the product to drying. n-Butanol alone can be used in this azeotropic distillation, but the results are less satisfactory.

The excess hydroquinone is recovered by adding water to the filtrate from the N-monomethyl-p-aminophenol sulphate and distilling as before. In this instance, the water is returned to the still. An aqueous solution of hydroquinone remains in the still and the pure solvent is collected in the receiver, to be used again in the next batch to be purified.

In the following example, the purification of a typical batch of crude N-monomethyl-p-aminophenol is described, in detail. This example is intended for the purpose of illustration and is not intended to be limiting in any manner.

A typical batch of crude N-monomethyl-p-aminophenol, selected to include a substantial amount of impurities in order to show the efficacy of our new process, after the autoclave reaction (see above) and after the excess monomethylamine has been recovered, consists of about 100 lbs. of N-monomethyl-p-aminophenol, 2.5 lb. of N,N'-dimethyl-p-phenylenediamine and 20 lb. of unreacted hydroquinone. This slurry is transferred to a still and 35 lb. of sodium hydroxide, 25 lb. of sodium sulphite and 2.5 lb. of zinc dust are added. The phenates formed by the action of the caustic soda, being more soluble than the free phenols, readily dissolve. The still is fitted with a steam inlet and an efficient still head to prevent the mechanical carrying over of non-volatile sodium phenates. The still is also connected to a suitable condenser provided with a receiver and manometer. The entire apparatus is evacuated to a pressure of about 25–30 mm. of mercury. The still is heated at the temperature of a steam bath until the batch is concentrated to a thick syrupy consistency but containing enough water to prevent solidification. Steam at 10 pounds gauge pressure is then passed through the batch at such a rate that the distillation temperature is 70–80° C., the volume of the batch remaining constant. We have found it convenient to take samples at various intervals during the distillation, by means of a two valve vacuum sampling tube, placed between the condenser and the receiver. When the distillate no longer shows the presence of N,N'-dimethyl-p-phenylenediamine the vacuum is released and system is flooded with nitrogen.

A convenient method of detecting the presence of N,N'-dimethyl-p-phenylenediamine is to treat a portion of the distillate with a strong sodium hydroxide solution and ether, with shaking. After the aqueous and ether layers separate, the ether layer is shaken with dilute (about 10%) sulphuric acid. The acid layer is separated and shaken with air. A pink color indicates the presence of N,N'-dimethyl-p-phenylenediamine, while a pale yellowish-white color indicates its absence.

The batch is rapidly transferred to a vessel fitted with an agitator, air being carefully excluded. Sufficient water is added to again dissolve the sodium phenates present and 10 lb. of activated charcoal is added. Agitation for a short time (about one-half hour) allows the impurities to sorb upon the activated charcoal. The solution is then filtered through a suitable filter, air excluded, into a still containing 92 lb. of sodium bisulphite or an equivalent sulphur dioxide solution. The N-monomethyl-p-aminophenol is immediately freed, sodium sulphite being formed at the same time.

Thirty gallons of a mixture consisting of 43.7% (weight,) of n-butanol and 56.3% of n-butyl acetate are added. On heating the still, the ternary mixture distils at 89.5° C. The distillate consists of 27.4% n-butanol, 35.3% n-butyl acetate and 37.3% water, which mixture, when condensed, separates into two layers. The solvent layer is returned to the still, while the water layer passes to a suitable receiver. When the temperature rises to 117° C., which is the boiling point of the binary solvent mixture, the liquid material is removed from the still, leaving a residue of inorganic salts, consisting principally of sodium sulphite. This removed solution, containing the free N-monomethyl-p-aminophenol, is cooled and 44.6 lb. of sulphuric acid, dissolved in enough water to make a 50% (weight) solution, are added. The N-monomethyl-p-aminophenol precipitates as the sulphate, leaving the hydroquinone in solution. The precipitated sulphate is filtered off, washed with a small amount of water and dried.

The hydroquinone remaining in solution is recovered by adding water and subjecting the ternary system to distillation as before. In this instance, the water is returned to the still. Upon continued distillation the organic solvent is completely removed from the still, leaving an aqueous solution of hydroquinone from which the hydroquinone may be recovered, if desired. The pure organic solvent which collects in the receiver can be used for the purification of the next batch of crude N-monomethyl-p-aminophenol.

In accordance with the present day nomenclature, the term, sorbent, is intended to mean any material which acts to absorb, adsorb or occlude substances in, on or by its surfaces. Activated charcoal is a very satisfactory sorbent for the herein described process. Activated clay can be used for the same purpose, but is less satisfactory.

In the claims, the term "impure N-monomethyl-p-aminophenol" is intended to mean a N-monomethyl-p-aminophenol contaminated with one or more of the following substances, in any proportion, namely N,N'-dimethyl-p-phenylene-diamine, hydroquinone, non-volatile nitrogen compounds, such as amines or imines, tars and other compounds, such as are found in N-monomethyl-p-aminophenol prepared, for instance, by treating hydroquinone with methylamine.

What we claim as our invention and desire to be secured by Letters Patent of the United States is:

1. A process for the purification of N-monomethyl-p-aminophenol comprising subjecting impure N-monomethyl-p-aminophenol, in the form of a water soluble metal salt, to steam distillation, in the absence of an oxidant, treating the residue from the steam distillation, in aqueous solution, with a sorbent, in the absence of an oxidant, freeing the N-monomethyl-p-aminophenol from its metal salt and subjecting the resulting aqueous solution to distillation with an inert organic solvent which forms with water an azeotropic mixture.

2. A process for the purification of N-monomethyl-p-aminophenol comprising subjecting impure N-monomethyl-p-aminophenol, in the form of a water soluble metal salt, to steam distillation, in the absence of an oxidant, treating the residue from the steam distillation in aqueous solution, with a sorbent, in the absence of an oxidant, freeing the N-monomethyl-p-aminophenol from its metal salt and subjecting the resulting aqueous solution to distillation with an inert organic solvent, which solvent forms with water an azeotropic mixture, having a boiling point lower than that of water.

3. A process for the purification of N-monomethyl-p-aminophenol comprising subjecting impure N-monomethyl-p-aminophenol, in the form of an alkali metal salt, to steam distillation, in the absence of an oxidant, treating the residue from the steam distillation, in aqueous solution, with a sorbent, in the absence of an oxidant, freeing the N-monomethyl-p-aminophenol from its alkali metal salt and subjecting the resulting aqueous solution to distillation with an inert organic solvent, which solvent forms with water an azeotropic mixture, having a boiling point lower than that of water.

4. A process for the purification of N-monomethyl-p-aminophenol comprising subjecting impure N-monomethyl-p-aminophenol, in the form of an alkali metal salt, to steam distillation, in the absence of an oxidant, treating the residue from the steam distillation, in aqueous solution, with a sorbent, in the absence of an oxidant, freeing the N-monomethyl-p-aminophenol from its alkali metal salt and subjecting the resulting aqueous solution to distillation with a mixture of n-butanol and n-butyl acetate.

5. A process for the purification of N-monomethyl-p-aminophenol comprising subjecting impure N-monomethyl-p-aminophenol, in the form of a water soluble metal salt, to steam distillation, in the absence of an oxidant, treating the residue from the steam distillation, in aqueous solution, with activated charcoal, in the absence of an oxidant, freeing the N-monomethyl-p-aminophenol from its metal salt and subjecting the resulting aqueous solution to distillation with an inert organic solvent, which solvent forms with water an azeotropic mixture, having a boiling point lower than that of water.

6. A process for the purification of N-monomethyl-p-aminophenol comprising subjecting impure N-monomethyl-p-aminophenol, in the form of an alkali metal salt, to steam distillation, in the absence of an oxidant, treating the residue from the steam distillation, in aqueous solution, with activated charcoal, in the absence of an oxidant, freeing the N-monomethyl-p-aminophenol from its alkali metal salt and subjecting the resulting aqueous solution to distillation with a mixture of n-butanol and n-butyl acetate.

7. A process for the purification of N-monomethyl-p-aminophenol comprising subjecting impure N-monomethyl-p-aminophenol, in the form of an alkali metal salt, to steam distillation, in the absence of an oxidant and under sub-atmospheric pressure, treating the residue from the steam distillation, in aqueous solution, with a sorbent, in the absence of an oxidant, freeing the N-monomethyl-p-aminophenol from its alkali metal salt and subjecting the resulting aqueous solution to distillation with an inert organic solvent, which solvent forms with water an azeotropic mixture and having a boiling point lower than that of water.

8. A process for the purification of N-monomethyl-p-aminophenol comprising subjecting impure N-monomethyl-p-aminophenol, in the form of an alkali metal salt, to steam distillation, in the absence of an oxidant and under sub-atmospheric pressure, treating the residue from the steam distillation, in aqueous solution, with a sorbent, in the absence of an oxidant, freeing the N-monomethyl-p-aminophenol from its alkali metal salt and subjecting the resulting aqueous solution to distillation with a mixture of n-butanol and n-butyl acetate.

9. A process for the purification of N-monomethyl-p-aminophenol comprising subjecting impure N-monomethyl-p-aminophenol, in the form of an alkali metal salt, to steam distillation, in the absence of an oxidant and under sub-atmospheric pressure, treating the residue from the steam distillation, in aqueous solution, with activated charcoal, in the absence of an oxidant, freeing the N-monomethyl-p-aminophenol from its alkali metal salt and subjecting the resulting aqueous solution to distillation with an organic solvent, which solvent forms with water an azeotropic mixture, having a boiling point lower than that of water.

10. A process for the purification of N-monomethyl-p-aminophenol comprising subjecting impure N-monomethyl-p-aminophenol, in the form of an alkali metal salt, to steam distillation in the absence of an oxidant and under sub-atmospheric pressure, treating the residue from the steam distillation, in aqueous solution, with activated charcoal, in the absence of an oxidant, freeing the N-monomethyl-p-aminophenol from its alkali metal salt, and subjecting the resulting aqueous solution to distillation with a mixture of n-butanol and n-butyl acetate.

11. A process for the preparation of pure N-monomethyl-p-aminophenol sulphate comprising subjecting impure N-monomethyl-p-aminophenol, in the form of an alkali metal salt, to steam distillation in the absence of an oxidant and under sub-atmospheric pressure, treating the residue from the steam distillation, in aqueous solution, with activated charcoal, in the absence of an oxidant, freeing the N-monomethyl-p-aminophenol from its alkali metal salt, subjecting the resulting aqueous solution to distillation with a mixture of n-butanol and n-butyl acetate and treating the resulting n-butanol-n-butyl acetate solution with sulphuric acid.

12. A process for the preparation of pure

N-monomethyl-p-aminophenol sulphate from impure N-monomethyl-p-aminophenol and recovering any hydroquinone present, comprising subjecting impure N-monomethyl-p-aminophenol, in the form of an alkali metal salt, to steam distillation, under sub-atmospheric pressure and in the absence of an oxidant, treating the residue from the steam distillation, in aqueous solution, with activated charcoal, in the absence of an oxidant, freeing the N-monomethyl-p-aminophenol from its alkali metal salt, subjecting the resulting aqueous solution to distillation with a mixture of n-butanol and n-butyl acetate, precipitating the N-monomethyl-p-aminophenol from the resulting n-butanol-n-butyl acetate solution with sulphuric acid and subjecting the resulting n-butanol-n-butyl acetate solution to distillation with water.

13. A process for the purification of N-monomethyl-p-aminophenol comprising subjecting impure N-monomethyl-p-aminophenol, in the form of an alkali metal salt, to steam distillation, under sub-atmospheric pressure and in the presence of an alkaline reducing agent, treating the residue from the steam distillation, in aqueous solution, with a sorbent, in an atmosphere of an inert gas, freeing the N-monomethyl-p-aminophenol from its alkali metal salt and subjecting the resulting aqueous solution to distillation with an inert organic solvent, which solvent forms with water an azeotropic mixture, having a boiling point lower than that of water.

14. A process for the purification of N-monomethyl-p-aminophenol comprising subjecting impure N-monomethyl-p-aminophenol, in the form of an alkali metal salt to steam distillation, under sub-atmospheric pressure and in the presence of an alkaline reducing agent, treating the residue from the steam distillation, in aqueous solution, with a sorbent, in an atmosphere of an inert gas, freeing the N-monomethyl-p-aminophenol from its alkali metal salt and subjecting the resulting aqueous solution to distillation with a mixture of n-butanol and n-butyl acetate.

15. A process for the purification of N-monomethyl-p-aminophenol comprising subjecting impure N-monomethyl-p-aminophenol, in the form of an alkali metal salt, to steam distillation, under sub-atmospheric pressure and in the presence of an alkaline reducing agent, treating the residue from the steam distillation, in aqueous solution, with activated charcoal, in an atmosphere of an inert gas, freeing the N-monomethyl-p-aminophenol from its alkali metal salt and subjecting the resulting aqueous solution to distillation with a mixture of n-butanol and n-butyl acetate.

16. A process for the purification of N-monomethyl-p-aminophenol comprising subjecting impure N-monomethyl-p-aminophenol, in the form of an alkali metal salt, to steam distillation, under sub-atmospheric pressure and in the presence of an alkaline reducing agent, treating the residue from the steam distillation, in aqueous solution, with activated charcoal, in an atmosphere of an inert gas, freeing the N-monomethyl-p-aminophenol from its alkali metal salt and subjecting the resulting aqueous solution to distillation with an inert organic solvent, which solvent forms with water an azeotropic mixture, having a boiling point lower than that of water.

17. A method of removing water from N-monomethyl-p-aminophenol comprising distilling a mixture of water and N-monomethyl-p-aminophenol with an inert organic solvent which forms with water an azeotropic mixture, having a boiling point lower than that of water.

18. A method of removing water from N-monomethyl-p-aminophenol comprising distilling a mixture of water and N-monomethyl-p-aminophenol with a mixture of n-butanol and n-butyl acetate.

19. A process for the removal of steam distillable impurities from impure N-monomethyl-p-aminophenol comprising subjecting the impure N-monomethyl-p-aminophenol, in the form of a water soluble metal salt, to steam distillation, in the absence of an oxidant.

20. A process for the removal of steam distillable impurities from impure N-monomethyl-p-aminophenol comprising subjecting the impure N-monomethyl-p-aminophenol, in the form of an alkali metal salt, to steam distillation, in the absence of an oxidant.

21. A process for the removal of impurities from impure N-monomethyl-p-aminophenol comprising subjecting the impure N-monomethyl-p-aminophenol, in the form of an alkali metal salt, to steam distillation, in the absence of an oxidant, treating the residue from the steam distillation in aqueous solution with activated charcoal.

HAROLD VON BRAMER.
ALBERT C. RUGGLES.
EDWIN A. ROBINSON.